US009125213B2

(12) United States Patent
Xu et al.

(10) Patent No.: US 9,125,213 B2
(45) Date of Patent: Sep. 1, 2015

(54) METHOD AND APPARATUS FOR VERIFYING RELEASE OF LIPA PDN CONNECTION IN WIRELESS COMMUNICATION SYSTEM

(75) Inventors: Jian Xu, Anyang-si (KR); Jin Sook Ryu, Anyang-si (KR); Kyung Min Park, Anyang-si (KR); Gene Beck Hahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 13/976,220

(22) PCT Filed: Jan. 6, 2012

(86) PCT No.: PCT/KR2012/000147
§ 371 (c)(1),
(2), (4) Date: Jun. 26, 2013

(87) PCT Pub. No.: WO2012/093886
PCT Pub. Date: Jul. 12, 2012

(65) Prior Publication Data
US 2013/0272268 A1    Oct. 17, 2013

Related U.S. Application Data

(60) Provisional application No. 61/430,881, filed on Jan. 7, 2011.

(51) Int. Cl.
*H04W 4/00* (2009.01)
*H04W 76/06* (2009.01)
*H04W 36/00* (2009.01)
*H04W 8/02* (2009.01)

(52) U.S. Cl.
CPC ........ *H04W 76/066* (2013.01); *H04W 36/0016* (2013.01); *H04W 8/02* (2013.01); *H04W 76/06* (2013.01)

(58) Field of Classification Search
CPC ... H04W 76/066; H04W 36/08; H04W 76/06; H04W 76/064
See application file for complete search history.

(56) References Cited

U.S. PATENT DOCUMENTS

| 2010/0272013 | A1 | 10/2010 | Horn et al. | |
| 2010/0278108 | A1 | 11/2010 | Cho et al. | |
| 2010/0329205 | A1 | 12/2010 | Bi et al. | |
| 2013/0188604 | A1* | 7/2013 | Chin et al. | 370/331 |
| 2013/0308527 | A1* | 11/2013 | Chin et al. | 370/328 |

FOREIGN PATENT DOCUMENTS

KR    10-2009-0030300    3/2009

* cited by examiner

*Primary Examiner* — Chi H Pham
*Assistant Examiner* — Fahmida Chowdhury
(74) *Attorney, Agent, or Firm* — Lee, Hong, Degerman, Kang & Waimey (57) ABSTRACT

A method and apparatus for verifying a release of a local IP access (LIPA) packet data network (PDN) connection in a wireless communication system is provided. A mobility management entity (MME) receives a handover preparation message from a source home eNodeB (HeNB), verifying whether the LIPA PDN connection has been released or not on receiving the handover preparation message. If the LIPA PDN connection has been released already, the MME performs a normal handover procedure. If the LIPA PDN connection has not been released, the MME transmits a handover preparation failure message to the source HeNB.

14 Claims, 9 Drawing Sheets

METHOD AND APPARATUS FOR VERIFYING RELEASE OF LIPA PDN CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2012/000147, filed on Jan. 6, 2012, which claims the benefit of U.S. Provisional Application Ser. No. 61/430,881, filed on Jan. 7, 2011, the contents of which are all hereby incorporated by reference herein in their entirety.

TECHNICAL FIELD

The present invention relates to wireless communication, and more particularly, to a method and apparatus for verifying a release of a local IP access (LIPA) packet data network (PDN) connection in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Figure 1:
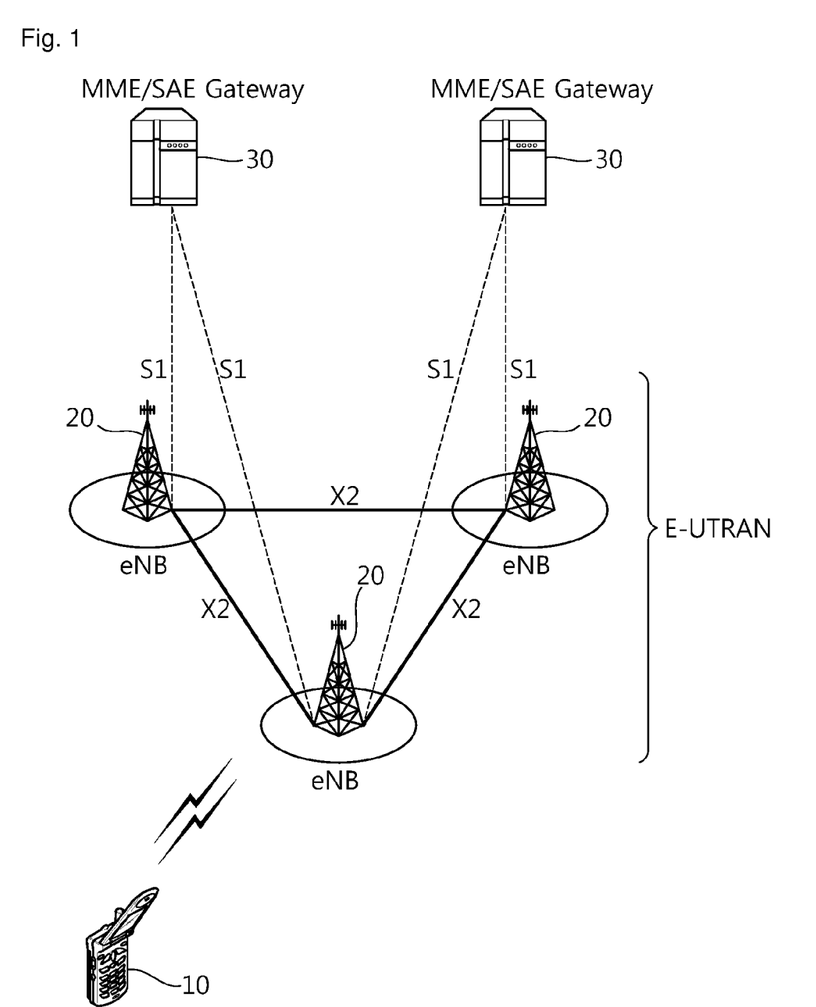
FIG. 1 shows network structure of an evolved universal mobile telecommunication system (E-UMTS).

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS security control, Inter CN node signaling for mobility between 3GPP access networks, Idle mode UE reachability (including control and execution of paging retransmission), tracking area list management (for UE in idle and active mode), PDN GW and serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including per-user based packet filtering (by e.g. deep packet inspection), lawful interception, UE IP address allocation, transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
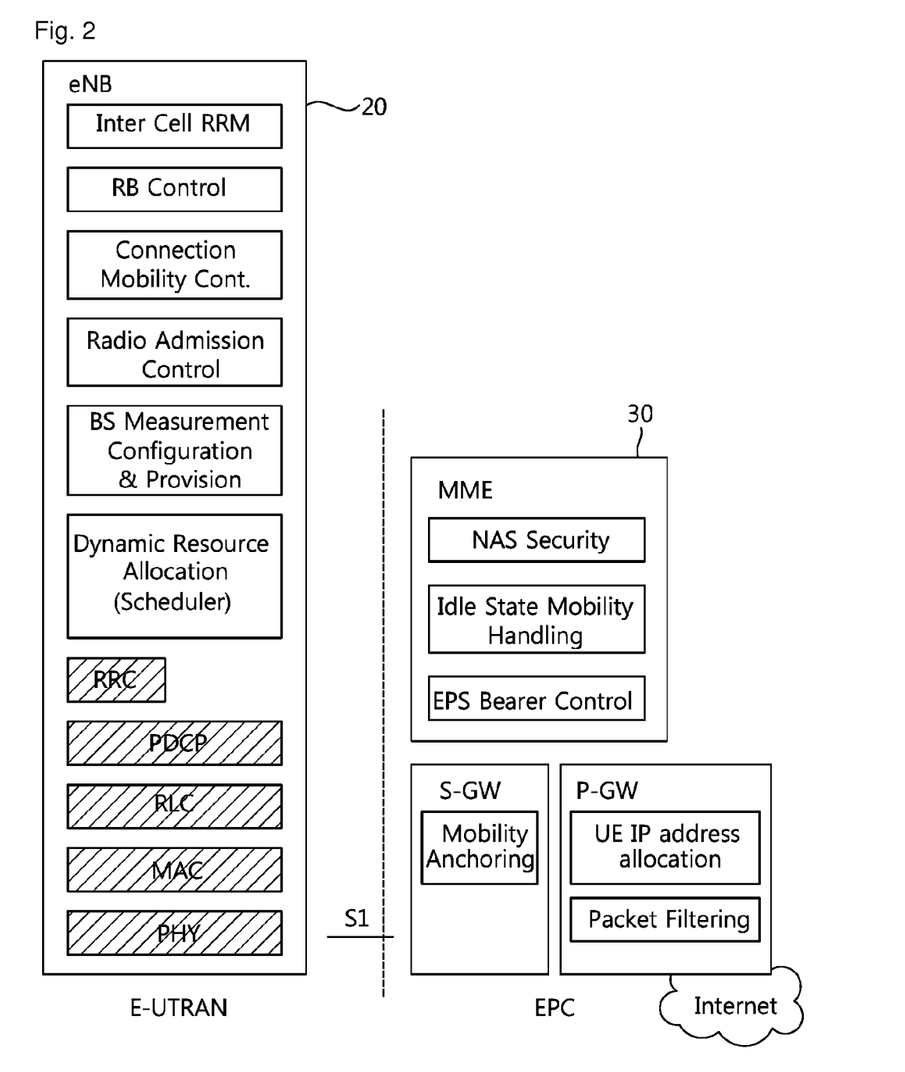
FIG. 2 shows architecture of a typical E-UTRAN and a typical EPC.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, system architecture evolution (SAE) bearer control, and ciphering and integrity protection of non-access stratum (NAS) signaling.

Figure 3:
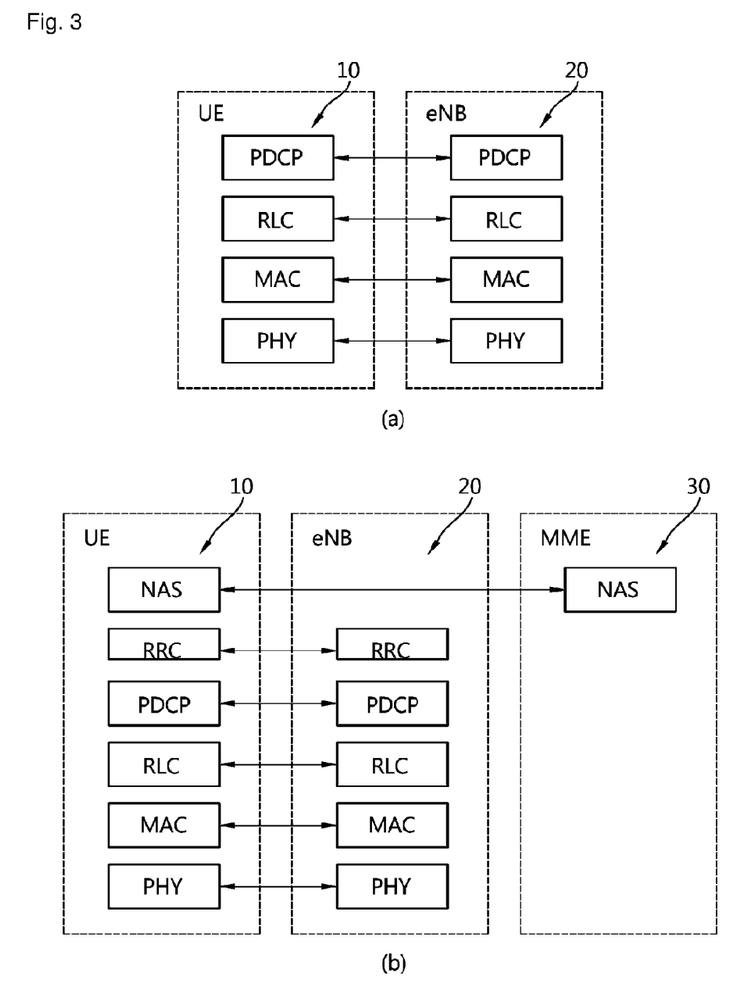
FIG. 3 shows a user-plane protocol and a control-plane protocol stack for the E-UMTS.

FIG. 3 shows a user-plane protocol and a control-plane protocol stack for the E-UMTS.

FIG. 3($a$) is block diagram depicting the user-plane protocol, and FIG. 3($b$) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, radio bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 4:
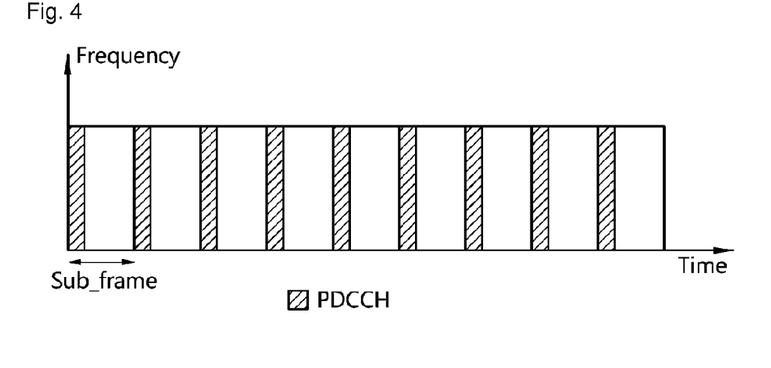
FIG. 4 shows an example of structure of a physical channel.

FIG. 4 shows an example of structure of a physical channel. The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and MCS.

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. The HeNB is a small base station designed for use in residential or small business environment. The HeNB may be a femto cell or a pico cell. The HeNB is short range about tens of meter, installed by the consumer for better indoor voice and data reception.

Figure 5:
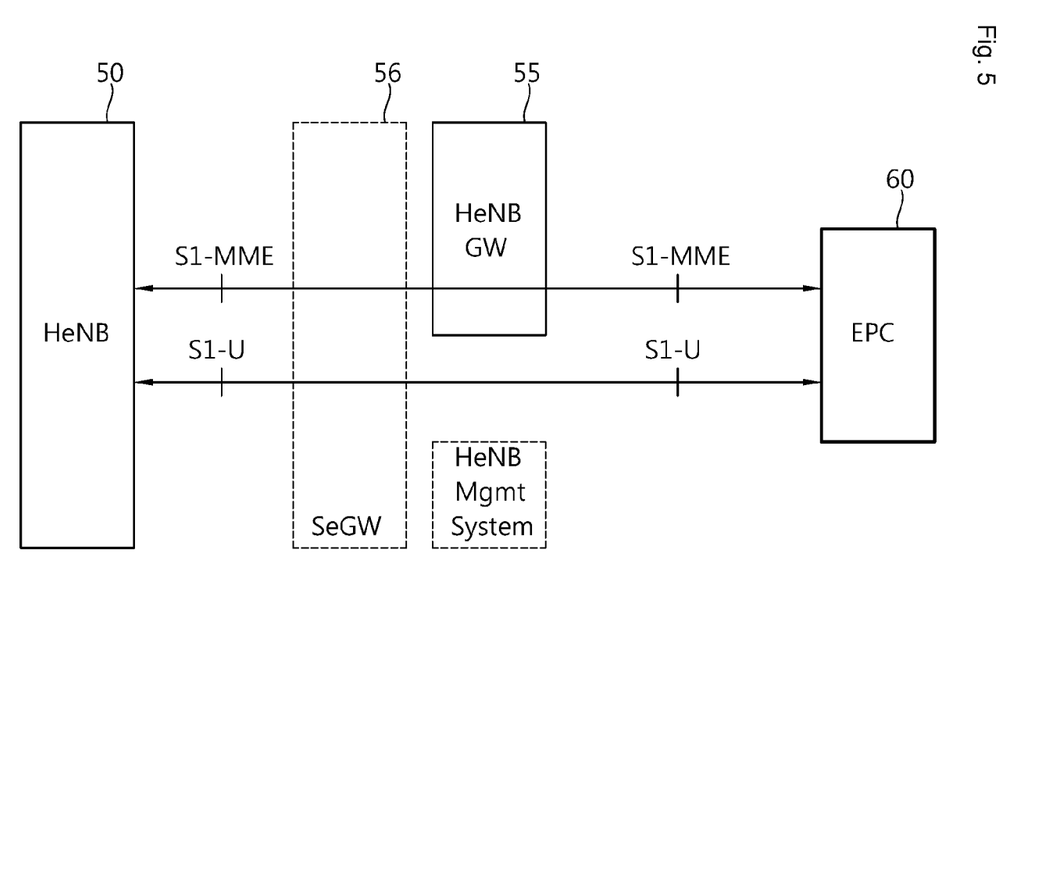
FIG. 5 shows logical architecture of an E-UTRAN HeNB.

FIG. 5 shows logical architecture of an E-UTRAN HeNB. It may be referred to Paragraph 4.6.1 of "Technical Specification Group Radio Access Network; Evolved Universal Terrestrial Radio Access (E-UTRA); and Evolved Universal Terrestrial Radio Access Network (E-UTRAN); Overall description; Stage 2 (release 9)" to 3GPP (3rd generation partnership project) TS 36.300 V9.4.0 (2010-06).

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

Figure 6:
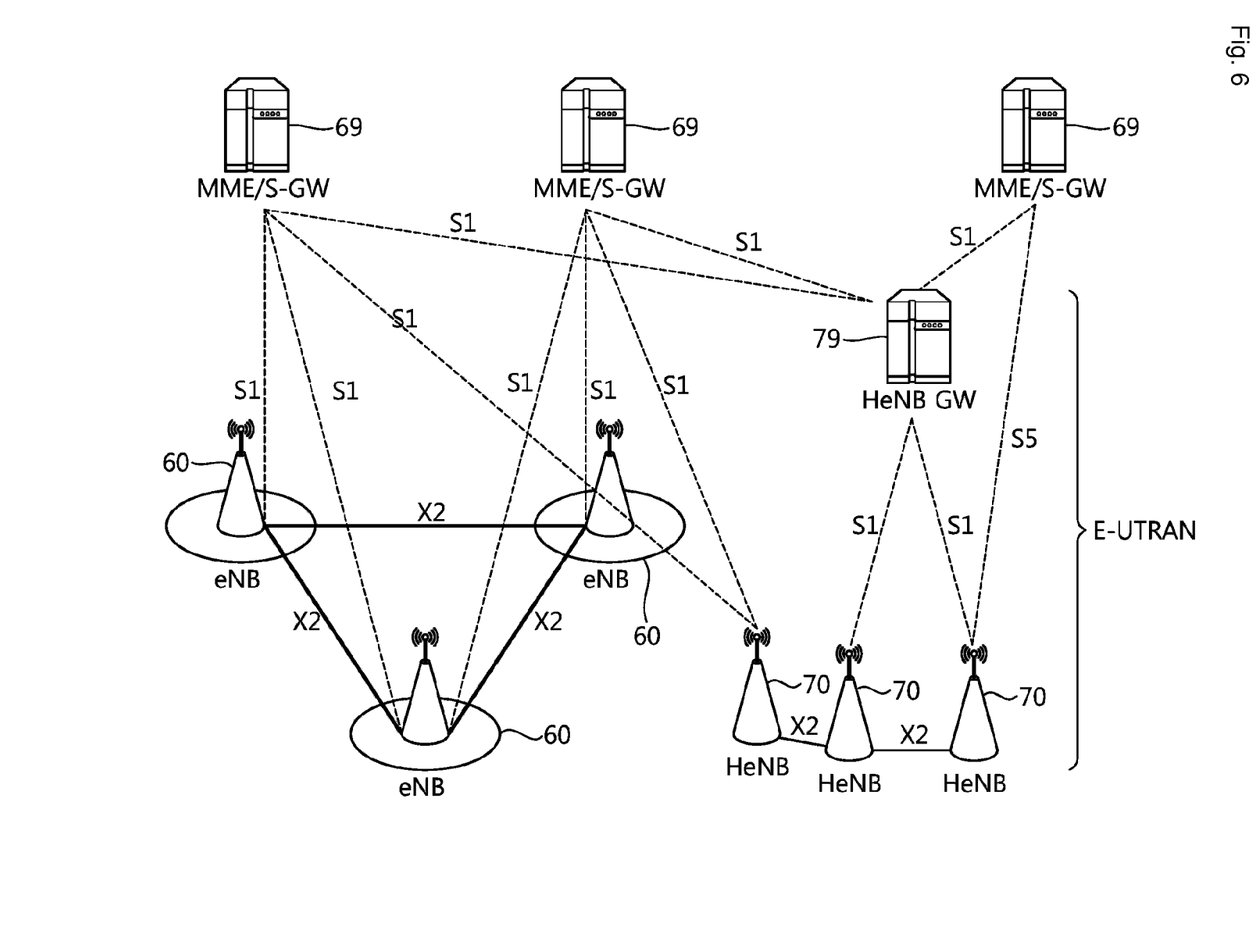
FIG. 6 shows overall architecture with deployed HeNB GW.

FIG. 6 shows overall architecture with deployed HeNB GW.

Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. Or, the one or more HeNB 70 may be connected to the MME/S-GW 69 through the S5 interface. The one or more HeNB 70 may be connected to each other through the X2 interface.

Meanwhile, 3GPP LTE-A may support a local IP access (LIPA). It may be referred to paragraph 4.3.16 of "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)" to 3GPP (3rd generation partnership project) TS 23.401 V10.2.0 (2010-12).

LIPA function enables an IP capable UE connected via a HeNB to access other IP capable entities in the same residential/enterprise IP network without the user plane traversing the mobile operator's network except HeNB subsystem. LIPA packet data network (PDN) connection means a PDN connection for LIPA for a UE connected to a HeNB.

Figure 7:
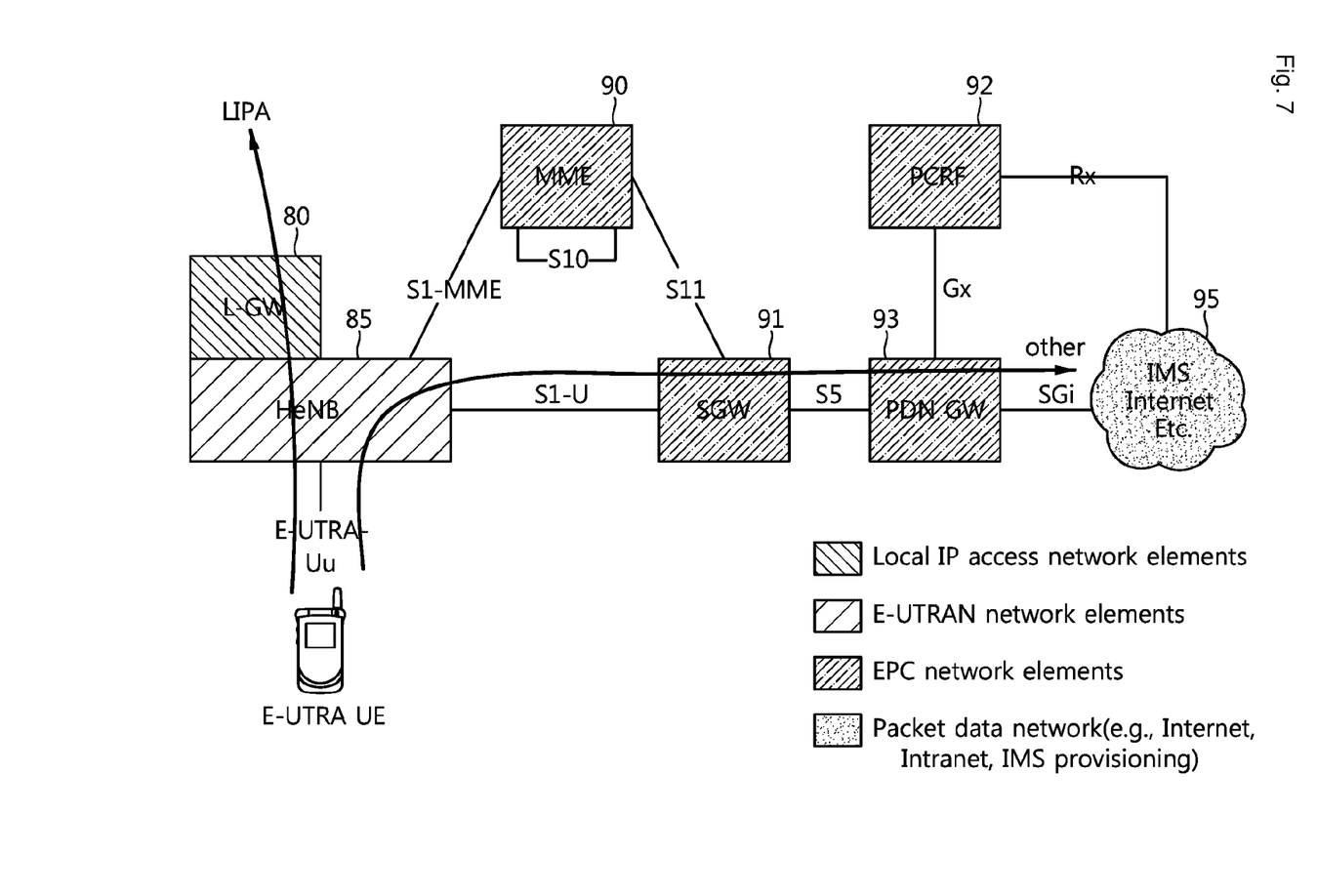
FIG. 7 shows LIPA architecture for a HeNB using a local PDN connection.

FIG. 7 shows LIPA architecture for a HeNB using a local PDN connection. It may be referred to paragraph 4.4.9 of "3rd Generation Partnership Project; Technical Specification Group Services and System Aspects; General Packet Radio Service (GPRS) enhancements for Evolved Universal Terrestrial Radio Access Network (E-UTRAN) access (Release 10)" to 3GPP (3rd generation partnership project) TS 23.401 V10.2.0 (2010-12).

Referring FIG. 7, the LIPA may be achieved using a local gateway (L-GW) 80 collocated with a HeNB 85. The L-GW 80 collocated with the HeNB 85 communicates with an E-UTRA UE through a LIPA user plane. The L-GW 80 is a gateway towards an IP networks (e.g. residential/enterprise networks) associated with the HeNB 85. The L-GW 80 has functions of ECM-IDLE mode downlink packet buffering and ECM-CONNECTED mode direct tunneling toward the HeNB 85, in addition to a basic PDN GW functions.

In LIPA architecture for the HeNB using the local PDN connection, the HeNB 85 may be connected to evolved packet core (EPC) network elements by means of the standard S1 interface. More specifically, the HeNB 85 may be connected to a mobility management entity (MME) 90 through an S1-MME interface. The HeNB 85 may be connected to a serving gateway (SGW) 91 through an S1-U interface. The MME 90 and the SGW 91 may be connected to each other through an S11 interface. When the LIPA is activated, the L-GW 80 and the SGW 91 may be connected to each other through an S5 interface. The SGW 91 may be connected to a PDN GW 93 through the S5 interface. The basic PDN connection may be achieved using the SGW 91 and the PDN GW 93.

If a UE served by a HeNB, which supports a LIPA PDN connection, requires an S1 or X2 handover to a neighbor HeNB or a macro eNB, the LIPA PDN connection cannot be kept. In other words, the LIPA PDN connection needs to be deactivated, and some messages may be transmitted to a core network for deactivating the LIPA PDN connection.

Accordingly, an efficient method for verifying a release of the LIPA PDN connection is required.

SUMMARY OF INVENTION

Technical Problem

The present invention provides a method and apparatus for verifying a release of a local IP access (LIPA) packet data network (PDN) connection in a wireless communication system. The present invention provides a method for performing a handover procedure after the release of the LIPA PDN connection is finally confirmed.

Solution to Problem

In an aspect, a method for verifying, by a mobility management entity (MME), a release of a local IP access (LIPA) packet data network (PDN) connection in a wireless communication system is provided. The method includes receiving a handover preparation message from a source home eNodeB (HeNB), on receiving the handover preparation message, verifying whether the LIPA PDN connection has been released or not, if the LIPA PDN connection has been released already, performing a normal handover procedure, and if the LIPA PDN connection has not been released, transmitting a handover preparation failure message to the source HeNB.

The release of the LIPA PDN connection may be verified when the handover preparation message is received after receiving a deactivate EPS bearer context accept message from the source HeNB.

The release of the LIPA PDN connection may be not verified when the handover preparation message is received immediately after receiving a deactivate bearer response message from the source HeNB.

The method may further include starting a timer after receiving the handover preparation message from the source HeNB.

The release of the LIPA PDN connection may be verified when a deactivate EPS bearer context accept message is received from the source HeNB before the time expires.

The release of the LIPA PDN connection may be not verified when a deactivate EPS bearer context accept message is not received from the source HeNB until the time expires.

The handover preparation failure message may include a cause information element (IE) comprising a cause value which is newly defined for the release of the LIPA PDN connection.

The cause value defined for the release of the LIPA PDN connection may indicate that the LIPA PDN connection is not release yet.

The handover preparation message may be a handover required message in case of a S1 handover procedure.

In another aspect, a method for preparing, by a home eNodeB (HeNB), a handover in a wireless communication system is provided. The method includes transmitting a deactivate bearer response message to a mobility management entity (MME), transmitting a deactivate EPS bearer context accept message to the MME, and transmitting a handover preparation message to the MME.

The method may further includes receiving a handover preparation failure message from the MME if the handover preparation message is transmitted immediately after transmitting the deactivate bearer response message.

The handover preparation failure message may include a cause information element (IE) comprising a cause value which is newly defined for a release of a local IP access (LIPA) packet data network (PDN) connection.

The cause value defined for the release of the LIPA PDN connection may indicate that the LIPA PDN connection is not release yet.

The handover preparation message may be transmitted with a delay intentionally after transmitting the deactivate EPS bearer context accept message for the MME confirming a release of a LIPA PDN connection.

The method may further include performing a normal handover procedure.

The handover preparation message may be a handover required message in case of a S1 handover procedure.

The deactivate EPS bearer context accept message may be an uplink non-access stratum (NAS) transport message carrying a user equipment (UE)-MME signaling over an S1 interface.

Advantageous Effects of Invention

The release of the LIPA PDN connection is efficiently verified by a mobility management entity (MME).

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 8:
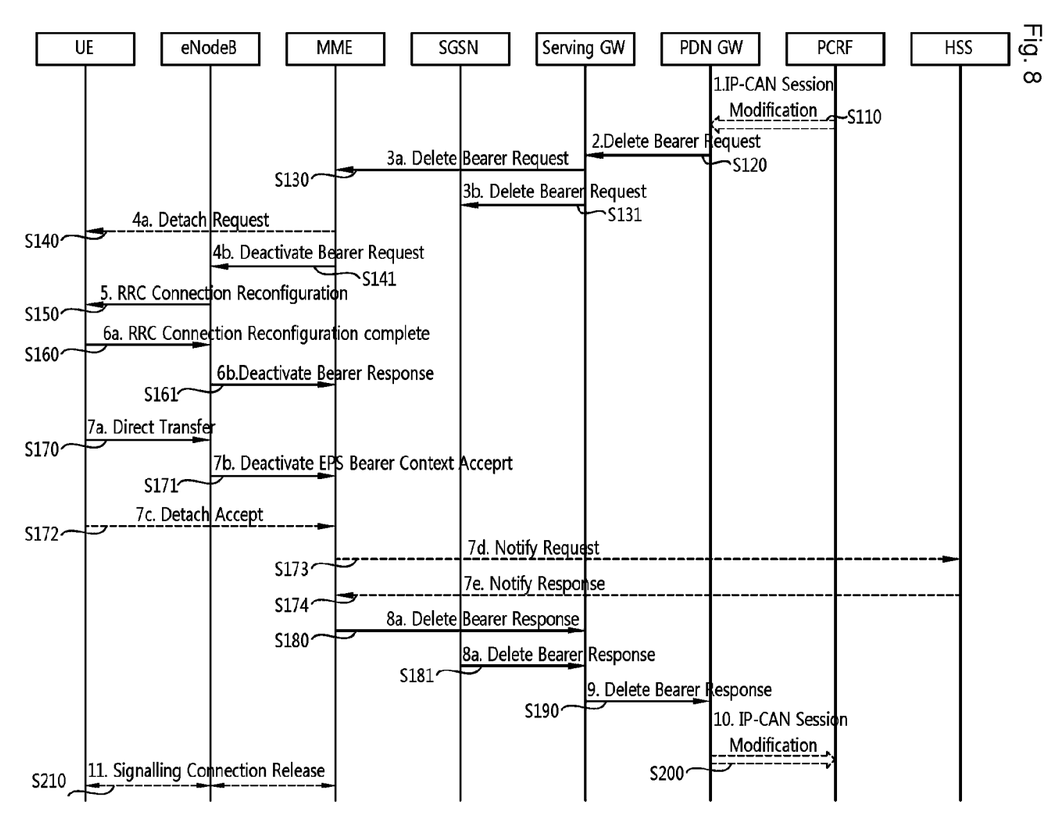
FIG. 8 shows an example of a bearer deactivation procedure initiated by a packet data network (PDN) gateway (GW).

FIG. 8 shows an example of a bearer deactivation procedure initiated by a packet data network (PDN) gateway (GW).

In this procedure, a user equipment (UE) is assumed to be in ECM-CONNECTED state. This procedure can be used to deactivate a dedicated bearer or deactivate all bearers belonging to a PDN address. If the default bearer belonging to a PDN connection is deactivated, the PDN GW deactivates all bearers belonging to the PDN connection.

The bearer deactivation procedure initiated by the PDN GW is described below.

(1) If dynamic policy charging control (PCC) is not deployed, a PDN GW is triggered to initiate the bearer deactivation procedure due either a QoS (quality of service) policy or on request from the MME. Optionally, a PCRF (policy charging rules function) sends QoS policy to the PDN GW (step S100). This corresponds to the initial steps of the PCRF-initiated IPCAN session modification procedure or the response to the PCEF (policy charging enforcement function) initiated IP-CAN session modification procedure. If dynamic PCC is not deployed, the PDN GW may apply local QoS policy. The PDN GW initiated bearer deactivation is also performed when handovers without optimization occurs from 3GPP to non-3GPP, in which case, the default bearer and all the dedicated bearers associated with the PDN address are released, but the PDN address is kept in the PDN GW.

(2) The PDN GW sends a delete bearer request message to a serving GW (step S110). The delete bearer request message may include at least one of a procedure transaction identifier (PTI), EPS bearer identity and causes. The delete bearer request message can also include an indication that all bearers belonging to that PDN connection shall be released. The PDN GW may include 'Cause' information element (IE) in the delete bearer request message and sets the IE to 'RAT changed from 3GPP to Non-3GPP' if the delete bearer request message is caused by handover without optimization occurs from 3GPP to non-3GPP.

(3) The serving GW sends the delete bearer request message to an MME (step S130). Also, if ISR is activated, the serving GW sends the delete bearer request message to a serving GPRS supporting node (SGSN) (step S131).

(4) If the last PDN connection of the UE is being released and the bearer deletion is neither due to ISR deactivation nor due to handover to non-3GPP accesses, the MME explicitly detaches the UE by sending a detach request message to the UE (step S140). If the UE is in ECM-IDLE state, the MME pages the UE. In this case, steps S141 to S171 below are skipped.

Otherwise, if this is not the last PDN connection for the UE which is being released, the MME sends a deactivate bearer request message to the eNodeB (step S141). The MME builds a NAS deactivate EPS bearer context request message including the EPS bearer identity, and includes it in the deactivate bearer request message.

(5) The eNodeB sends an RRC connection reconfiguration message including the EPS radio bearer identity to release and the NAS deactivate EPS bearer context request message to the UE (step S150).

(6) The UE releases the radio bearers indicated in the RRC connection reconfiguration message. The UE responds to a RRC connection reconfiguration complete message to the eNodeB (step S160). The eNodeB acknowledges the bearer deactivation to the MME with a deactivate bearer response (EPS bearer identity) message (step S161).

(7) The UE builds a deactivate EPS bearer context accept message including EPS bearer identity. The UE then sends a direct transfer (deactivate EPS bearer context accept) message to the eNodeB (step S170). The eNodeB sends the deactivate EPS bearer context accept (uplink NAS transport) message to the MME (step S171).

If the UE receives the detach request message from the MME in the step S140, the UE sends a detach accept message to the MME. The eNodeB forwards the detach accept message to the MME (step S172).

(8) The MME deletes the bearer context related to the deactivated EPS bearer and acknowledges the bearer deactivation to the serving GW by sending a delete bearer response message (step S180). Also, the SGSN deletes PDP context related to the deactivated EPS bearer and acknowledges the bearer deactivation to the serving GW by sending the delete bearer response message (step S181).

(9) If ISR is activated, after receiving the two delete bearer response messages from the MME and the SGSN, or if ISR is not activated, after receiving the delete bearer response messages from the MME, the serving GW deletes the bearer context related to the deactivated EPS bearer acknowledges the bearer deactivation to the PDN GW by sending the delete bearer response message (step S190).

(10) The PDN GW deletes the bearer context related to the deactivated EPS bearer (step S200). If the dedicated bearer deactivation procedure was triggered by receiving a PCC decision message from the PCRF, the PDN GW indicates to the PCRF whether the requested PCC decision was successfully enforced by completing the PCRF-initiated IPCAN Session Modification procedure or the PCEF initiated IP-CAN Session Modification procedure.

(11) If the UE is being explicitly detached, the MME releases the S1-MME signalling connection for the UE by sending an S1 release command (Cause) message to the eNodeB (step S210).

The PDN GW initiated bearer deactivation procedure shown in FIG. 8 may be used for the LIPA PDN connection release. Mobility of the LIPA PDN connection may be not supported in 3GPP LTE-A. Accordingly, the LIPA PDN connection shall be released when the UE moves away from the HeNB with the L-GW. In this case, before starting the handover procedure towards a target radio access network (RAN), the HeNB may request using an intra-node signaling the collocated L-GW to release the LIPA PDN connection. The L-GW may initiate and complete the release of the LIPA PDN connection using the PDN GW initiated bearer deactivation procedure shown in FIG. 8.

Meanwhile, during the PDN GW initiated bearer deactivation procedure, the HeNB may proceed with a handover preparation procedure towards the target RAN when an E-UTRAN radio access bearer (E-RAB) context is clear for the correlation ID. Accordingly, the source HeNB may initiate the handover preparation procedure after the source HeNB transmits the deactivate bearer response message to the MME (step S161 in FIG. 8). As the deactivate bearer response message stands for the E-RAB release complete message, the HeNB may think that the corresponding E-RAB including the E-RAB context is already released. Or, the source HeNB may initiate the handover preparation procedure after the source HeNb transmits the deactivate EPS bearer context accept message to the MME (step S171 in FIG. 8). As the source HeNB receives a context release confirmation from the UE using the direct transfer message (step S170 in FIG. 8), the source HeNB may confirm that the E-RAB context is clear for the correlation ID. There is no clear proposal about when the handover preparation procedure is initiated.

In addition, during the handover preparation procedure, the MME may verify whether the LIPA PDN connection has been finally released. If the LIPA PDN connection has not been released, the MME may reject the handover preparation. If the source HeNB initiates the handover preparation procedure before the deactivation EPS bearer context accept message is transmitted, the MME may reject the handover preparation to source HeNB. However, the method of rejecting the handover preparation is not proposed yet.

A proposed method for verifying a release of the LIPA PDN connection is described below.

Figure 9:
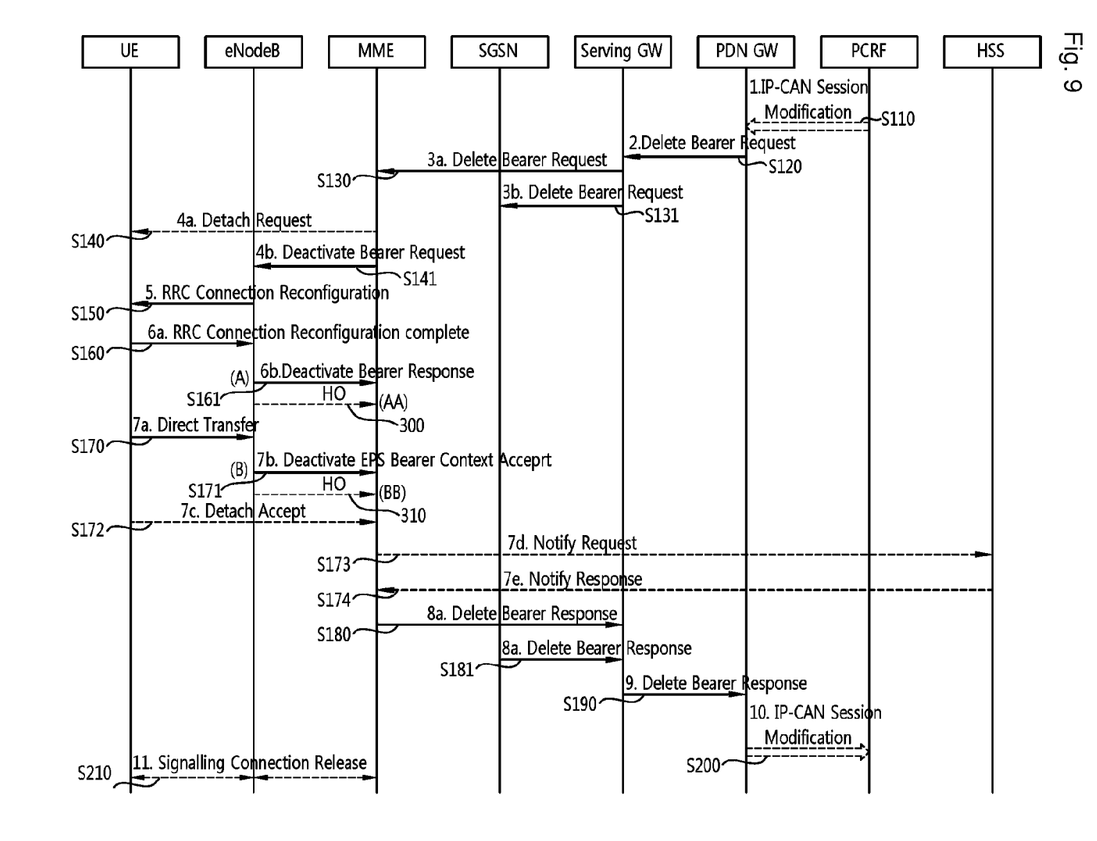
FIG. 9 shows an example of PDN GW initiated bearer deactivation procedure according an embodiment of the proposed invention.

FIG. 9 shows an example of PDN GW initiated bearer deactivation procedure according an embodiment of the proposed invention.

As described above, the MME may verify whether the LIPA PDN connection has been finally released or not when the source HeNB transmits the deactivate bearer response (EPS bearer identity) message to the MME (point AA). Or, the MME may verify whether the LIPA PDN connection has been finally released or not when the source HeNB transmits the deactivate EPS bearer context accept (uplink NAS transport) message to the MME (point BB). Likewise, the source HeNB may initiate the handover preparation procedure at point A or at point B in FIG. 9 by transmitting a handover preparation (handover required) message to the MME or a target (H)eNB. In the case that MME verifies whether the LIPA PDN connection has been released or not at point BB, right after the MME receives the deactivate EPS bearer context accept message from the source HeNB, the following options may be proposed.

1) If the source HeNB transmits the handover preparation (handover required) message (300) immediately after the source HeNB transmits the deactivate bearer response message to the MME, i.e., at point A, the MME may acquire the handover preparation message before the MME received the final confirmation for releasing the LIPA PDN connection from the UE, i.e., at point BB. In this case, the MME transmits a handover preparation failure message to the source HeNB to reject the handover preparation. The handover preparation failure message may include a cause IE comprising a cause value which is newly defined for LIPA PDN connection release. The purpose of the cause IE is to indicate the reason for a particular event for the S1AP protocol.

Table 1 indicates the cause IE comprising the cause value which is newly defined for LIPA PDN connection release.

TABLE 1

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED(Unspecified, $TX2_{RELOCoverall}$ Expiry, Successful Handover, Release due to E-UTRAN Generated Reason, Handover Cancelled, Partial Handover, Handover Failure In Target EPC/eNB Or Target System, Handover Target not allowed, LIPA PDN connection not released $TS1_{RELOCoverall}$ Expiry, $TS1_{RELOCprep}$ Expiry, Cell not available, Unknown Target ID, No Radio Resources Available in Target Cell, Unknown or already allocated MME UE S1AP ID, Unknown or already allocated eNB UE S1AP ID, Unknown or inconsistent pair of UE S1AP ID, Handover desirable for radio reasons, Time critical handover, Resource optimisation handover, Reduce load in serving cell, User inactivity, Radio Connection With UE Lost, Load Balancing TAU Required, CS Fallback Triggered, UE Not Available For PS Service, Radio resources not available, Failure in the Radio Interface Procedure, Invalid QoS combination, Inter-RAT redirection, Interaction with other procedure, Unknown E-RAB ID, Multiple E-RAB ID instances, Encryption and/or integrity protection algorithms not supported, S1 intra system Handover triggered, S1 inter system Handover triggered, X2 Handover triggered . . . , Redirection towards 1xRTT, Not supported QCI value, invalid CSG Id) | |
| >Transport Layer | | | | |
| >>Transport Layer Cause | M | | ENUMERATED(Transport Resource Unavailable, Unspecified, . . . ) | |
| >NAS | | | | |
| >>NAS Cause | M | | ENUMERATED (Normal Release, Authentication failure, Detach, Unspecified, . . . , CSG Subscription Expiry) | |

TABLE 1-continued

| IE/Group Name | Presence | Range | IE Type and Reference | Semantics Description |
|---|---|---|---|---|
| >Protocol | | | | |
| >>Protocol Cause | M | | ENUMERATED(Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . . ) | |
| >Misc | | | | |
| >>Miscellaneous Cause | M | | ENUMERATED(Control Processing Overload, Not enough User Plane Processing Resources, Hardware Failure, O&M Intervention, Unspecified, Unknown PLMN, . . . ) | |

Referring to Table 1, it can be found that the cause value "LIPA PDN connection not release" is newly defined.

Table 2 describes the meaning of the different cause values.

TABLE 2

| Radio Network Layer cause | Meaning |
|---|---|
| Unspecified | Sent for radio network layer cause when none of the specified cause values applies |
| TX2RELOCOverall Expiry | The timer guarding the handover that takes place over X2 has abnormally expired. |
| Successful Handover | Successful handover. |
| Release due to E-UTRAN generated reason | Release is initiated due to E-UTRAN generated reason. |
| Handover Cancelled | The reason for the action is cancellation of Handover |
| Partial Handover | Provides a reason for the handover cancellation. The HANDOVER COMMAND message from MME contained E-RABs to Release List IE and the source eNB estimated service continuity for the UE would be better by not proceeding with handover towards this particular target eNB. |
| Handover Failure In Target EPC/eNB Or Target System | The handover failed due to a failure in target EPC/eNB or target system. |
| Handover Target not allowed | Handover to the indicated target cell is not allowed for the UE in question. |
| LIPA PDN Connection not released | The LIPA PDN connection is not released yet. |
| $TS1_{RELOCoverall}$ Expiry | The reason for the action is expiry of timer $TS1_{RELOCoverall}$. |
| $TS1_{RELOCprep}$ Expiry | Handover Preparation procedure is cancelled when timer $TS1_{RELOCprep}$ expires. |
| Cell not available | The concerned cell is not available. |
| Unknown Target ID | Handover rejected because the target ID is not known to the EPC. |
| No radio resources available in target cell | Load on target cell is too high. |
| Unknown or already allocated MME UE S1AP ID | The action failed because the MME UE S1AP ID is either unknown, or (for a first ssage received at the eNB) is known and already allocated to an existing context. |
| Unknown or already allocated eNB UE S1AP ID | The action failed because the eNB UE S1AP ID is either unknown, or (for a first ssage received at the MME) is known and already allocated to an existing context. |
| Unknown or inconsistent pair of UE S1AP ID | The action failed because both UE S1AP IDs are unknown, or are known but do not define a single UE context. |
| Handover Desirable for Radio Reasons | The reason for requesting handover is radio related. |
| Time Critical Handover | handover is requested for time critical reason i.e. this cause value is reserved to represent all critical cases where the connection is likely to be dropped if handover is not performed. |

TABLE 2-continued

| Radio Network Layer cause | Meaning |
|---|---|
| Resource Optimisation Handover | The reason for requesting handover is to improve the load distribution with the neighbour cells. |
| Reduce Load in Serving Cell | Load on serving cell needs to be reduced. |
| User Inactivity | The action is requested due to user inactivity on all E-RABs e.g. S1 is requested to be released in order to optimise the radio resources. |
| Radio Connection With UE Lost | The action is requested due to loosing the radio connection to the UE. |
| Load Balancing TAU Required | The action is requested for all load balancing and offload cases in the MME. |
| CS Fallback triggered | The action is due to a CS fallback that has been triggered. When it is included in UE CONTEXT RELEASE REQUEST message, it indicates the PS service suspension is not required in the EPC. |
| UE Not Available for PS Service | The action is requested due to a Cell Change Order, or CS fallback to GERAN/UTRAN that has been triggered. In case of CS fallback to GERAN, it indicates that either the target GERAN cell or the UE has no DTM capability. |
| Radio resources not available | No requested radio resources are available |
| Invalid QoS combination | The action was failed because of invalid QoS combination. |
| Inter-RAT Redirection | The release is requested due to inter-RAT redirection. When it is included in UE CONTEXT RELEASE REQUEST message, it indicates the PS service suspension is not required in the EPC. |
| Failure in the Radio Interface Procedure | Radio interface procedure has failed |
| Interaction with other procedure | The action is due to an ongoing interaction with another procedure |
| Unknown E-RAB ID | The action failed because the E-RAB ID is unknown in the eNB |
| Multiple E-RAB ID Instances | The action failed because multiple instance of the same E-RAB had been provided to the eNB |
| Encryption and/or integrity protection algorithms not supported | The eNB is unable to support any of the encryption and/or integrity protection algorithms supported by the UE. |
| S1 Intra system Handover triggered | The action is due to a S1 intra system handover that has been triggered. |
| S1 Inter system Handover triggered | The action is due to a S1 inter system handover that has been triggered. |
| X2 Handover triggered | The action is due to an X2 handover that has been triggered. |
| Redirection towards 1xRTT | The release is requested due to redirection towards a 1xRTT system due to mobility, CS fallback to 1xRTT, or SRVCC to 1xRTT, when the PS service suspension is required in the EPC. |
| Not supported QCI Value | The E-RAB setup failed because the requested QCI is not supported. |
| Invalid CSG Id | The CSG ID provided to the target eNB was found invalid. |

Referring to Table 2, the cause value "LIPA PDN connection not released" indicates that the LIPA PDN connection is not released yet. Meanwhile, "not supported" cause values in Table 2 indicate that the related capability is missing. And, "not available" cause values in Table 2 indicate that the related capability is present, but insufficient resources were available to perform the requested action.

2) The source HeNB may delay and transmit the handover preparation (handover required) message (310) after the source HeNB transmits the deactivate EPS bearer context accept message to the MME, i.e., at point B. That is, the handover preparation message is received by the MME at point BB. Accordingly, the handover preparation message may be transmitted intentionally with some delay, for the MME confirming the release of the LIPA PDN connection, even though the source HeNB thinks that the corresponding E-RAB including E-RAB context is already released.

3) On receiving the handover preparation message from the source HeNB, the MME may start a timer. If the MME receives a final confirmation of the LIPA PDN connection release from UE by receiving the deactivate EPS bearer context accept message before the time expires, the MME verifies whether the LIPA PDN connection has been finally released and performs the normal handover procedure. If the MME has not received a final confirmation of the LIPA PDN connection release from UE until the time expires, the MME transmits the handover preparation failure message to the source HeNB to reject the handover preparation procedure. In this case, the handover preparation failure message may include a cause IE comprising a cause value which is newly defined for LIPA PDN connection release as shown in Table 1.

Figure 10:
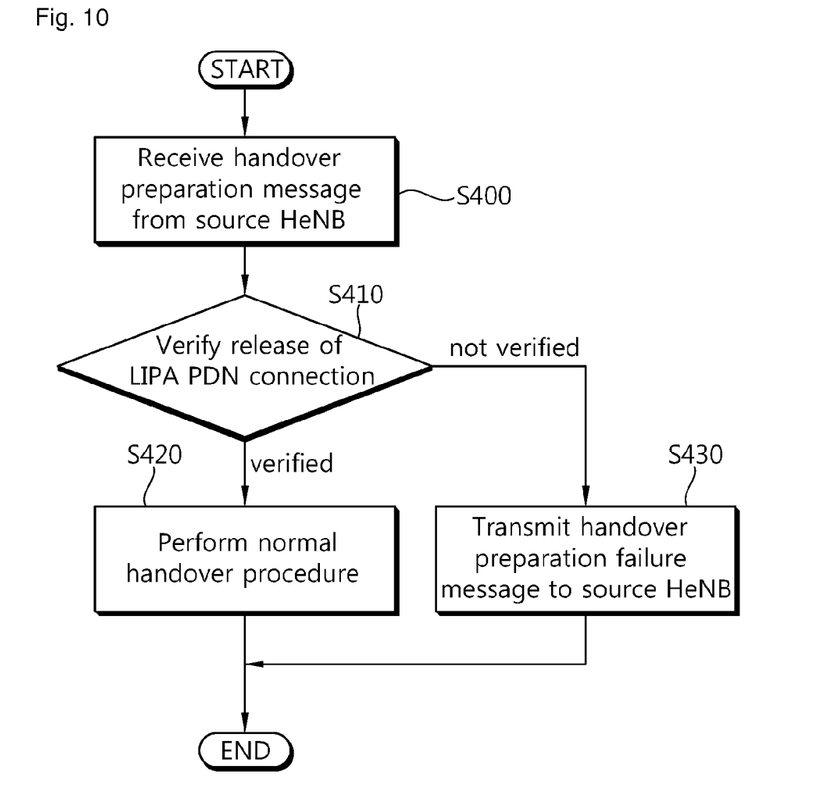
FIG. 10 shows the proposed method according to an embodiment of the present invention.

FIG. 10 shows the proposed method according to an embodiment of the present invention.

Referring to FIG. 10, a MME receives a handover preparation message from a source HeNB in step S400. The MME verifies the handover message in step S410. If the handover preparation message is verified, the MME performs a normal handover procedure in step S420. If the handover preparation message is not verified, the MME transmits a handover preparation failure message to the source HeNB. In this case, the MME may use a timer. Also, the handover preparation failure message may include a cause IE comprising a cause value which is newly defined for LIPA PDN connection release.

The proposed method described above may be applied to an S1 handover procedure, which is a handover procedure through a HeNB GW or an MME over the S1 interface. Or, the proposed method described above may be applied to an X2 handover procedure, which is a handover procedure between a source HeNB and a target (H)eHB over the X2 interface. The X2 interface may be direct or may be through the X2 proxy HeNB GW.

Figure 11:
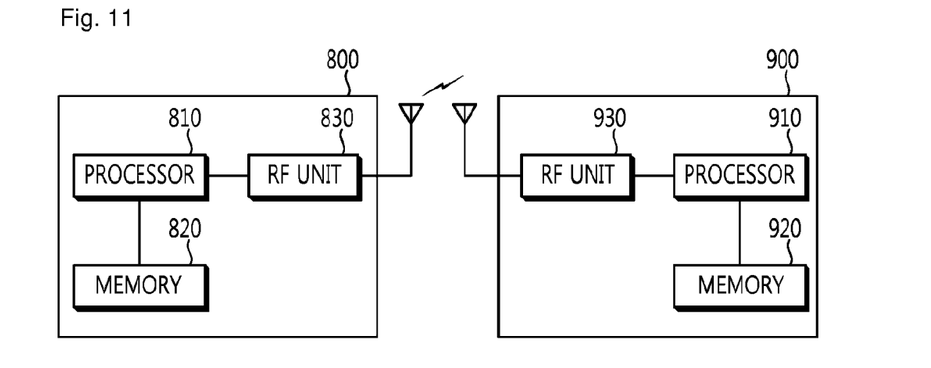
FIG. 11 is a block diagram showing wireless communication system to implement an embodiment of the present invention.

FIG. 11 is a block diagram showing wireless communication system to implement an embodiment of the present invention.

A MME 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A source HeNB 900 may include a processor 910, a memory 920 and a RF unit 930.

The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for verifying, by a mobility management entity (MME), a release of a local IP access (LIPA) packet data network (PDN) connection in a wireless communication system, the method comprising:
    receiving a handover preparation message from a source home eNodeB (HeNB);
    upon receiving the handover preparation message, starting a timer;
    upon receiving the handover preparation message, verifying whether the LIPA PDN connection has been released or not;
    if the LIPA PDN connection has been released already, performing a normal handover procedure; and
    if the LIPA PDN connection has not been released, transmitting a handover preparation failure message to the source HeNB,
    wherein the release of the LIP PDN connection is verified when a deactivate EPS bearer context accept message is received from the source HeNB before the timer expires.

2. The method of claim 1, wherein the release of the LIPA PDN connection is verified when the handover preparation message is received after receiving a deactivate EPS bearer context accept message from the source HeNB.

3. The method of claim 1, wherein the release of the LIPA PDN connection is not verified when the handover preparation message is received immediately after receiving a deactivate bearer response message from the source HeNB.

4. The method of claim 1, wherein the release of the LIPA PDN connection is not verified when a deactivate EPS bearer context accept message is not received from the source HeNB until the time expires.

5. The method of claim 1, wherein the handover preparation failure message includes a cause information element (IE) comprising a cause value which is newly defined for the release of the LIPA PDN connection.

6. The method of claim 5, wherein the cause value defined for the release of the LIPA PDN connection indicates that the LIPA PDN connection is not release yet.

7. The method of claim 1, wherein the handover preparation message is a handover required message in case of a S1 handover procedure.

8. A method for preparing, by a home eNodeB (HeNB), a handover in a wireless communication system, the method comprising:
    transmitting a deactivate bearer response message to a mobility management entity (MME);
    transmitting a deactivate EPS bearer context accept message to the MME; and
    transmitting a handover preparation message to the MME, wherein the handover preparation message is transmitted with a delay intentionally after transmitting the deactivate EPS bearer context accept message fir the MME confirming a release of a LIPA PDN connection.

9. The method of claim 8, further comprising receiving a handover preparation failure message from the MME if the handover preparation message is transmitted immediately after transmitting the deactivate bearer response message.

10. The method of claim 9, wherein the handover preparation failure message includes a cause information element (IE) comprising a cause value which is newly defined for a release of a local IP access (LIPA) packet data network (PDN) connection.

11. The method of claim 10, wherein the cause value defined for the release of the LIPA PDN connection indicates that the LIPA PDN connection is not release yet.

12. The method of 8, further comprising performing a normal handover procedure.

13. The method of claim 8, wherein the handover preparation message is a handover required message in case of a S1 handover procedure.

14. The method of claim 8, wherein the deactivate EPS bearer context accept message is an uplink non-access stratum (NAS) transport message carrying a user equipment (UE)—MME signaling over an S1 interface.

* * * * *